United States Patent
Sloane

(10) Patent No.: US 11,423,163 B2
(45) Date of Patent: Aug. 23, 2022

(54) SYSTEM FOR CONTROLLING COMPUTING PROCESS EXECUTION BY USERS WITH ELEVATED ACCESS PRIVILEGE

(71) Applicant: Bank of America Corporation, Charlotte, NC (US)

(72) Inventor: Brandon Sloane, Santa Barbara, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 216 days.

(21) Appl. No.: 16/898,625

(22) Filed: Jun. 11, 2020

(65) Prior Publication Data

US 2021/0390193 A1    Dec. 16, 2021

(51) Int. Cl.
*G06F 21/62* (2013.01)
*G06F 21/30* (2013.01)

(52) U.S. Cl.
CPC .............. *G06F 21/62* (2013.01); *G06F 21/30* (2013.01)

(58) Field of Classification Search
CPC ......... G06F 21/62; G06F 21/30; G06F 21/554
USPC .......................................................... 726/19
See application file for complete search history.

(56) References Cited

U.S. PATENT DOCUMENTS

| | | | |
|---|---|---|---|
| 5,469,556 A * | 11/1995 | Clifton | G06F 21/85 726/4 |
| 6,993,581 B1 | 1/2006 | Blumenau et al. | |
| 7,913,311 B2 | 3/2011 | Alain et al. | |
| 8,127,316 B1 | 2/2012 | Binotto et al. | |
| 8,498,941 B2 | 7/2013 | Felsher | |
| 8,600,895 B2 | 12/2013 | Felsher | |
| 8,732,182 B2 | 5/2014 | Bethlehem et al. | |
| 8,769,642 B1 | 7/2014 | ONeill et al. | |
| 8,788,673 B2 | 7/2014 | Bernardi et al. | |
| 8,806,494 B2 | 8/2014 | Russinovich et al. | |
| 8,856,953 B2 | 10/2014 | Antill | |
| 8,966,570 B1 * | 2/2015 | Roth | H04L 63/08 726/1 |
| 9,043,309 B2 | 5/2015 | Ahmed et al. | |
| 9,419,951 B1 | 8/2016 | Felsher et al. | |
| 9,443,081 B2 | 9/2016 | Austin | |
| 9,558,343 B2 | 1/2017 | Beauregard et al. | |
| 9,648,036 B2 | 5/2017 | Seiver et al. | |
| 9,734,441 B2 | 8/2017 | Austin et al. | |
| 9,787,681 B2 | 10/2017 | Clancy, III et al. | |
| 10,101,936 B2 | 10/2018 | Kirshenbaum | |
| 10,229,279 B2 | 3/2019 | Garcia et al. | |
| 2005/0081020 A1 * | 4/2005 | Volp | G06F 12/1036 712/228 |
| 2012/0271854 A1 | 10/2012 | Truong et al. | |

(Continued)

*Primary Examiner* — Jacob Lipman
(74) *Attorney, Agent, or Firm* — Moore & Van Allen PLLC; Seongun M. Hong

(57) ABSTRACT

A system is provided for controlling computing process execution by users with elevated access privilege. In particular, the system may be configured to hook into the process command loop for a computing system within the network environment to monitor the users logged into the system as well as computing processes being executed. The system may further flag the users and processes according to their type. If the system detects a mismatch between the user and the process, the system may automatically suspend the process from being executed. In this way, the system may ensure that processes are executed only by their authorized users.

17 Claims, 2 Drawing Sheets

(56) References Cited

U.S. PATENT DOCUMENTS

2016/0210069 A1    7/2016  Lutas et al.
2017/0332233 A1*  11/2017  Zhang .................. H04M 15/47
2019/0121964 A1    4/2019  LeMay et al.

* cited by examiner

200

```
┌─────────────────────────────────────────────────────────────┐
│ DETECT THAT A USER IS ATTEMPTING TO EXECUTE A PROCESS ON    │
│                   A USER COMPUTING SYSTEM                    │
│                            201                               │
└─────────────────────────────────────────────────────────────┘
                              │
                              ▼
┌─────────────────────────────────────────────────────────────┐
│         RETRIEVE A USER FLAG VALUE ASSOCIATED WITH THE USER  │
│                            202                               │
└─────────────────────────────────────────────────────────────┘
                              │
                              ▼
┌─────────────────────────────────────────────────────────────┐
│        RETRIEVE A PROCESS FLAG VALUE ASSOCIATED WITH THE    │
│                           PROCESS                            │
│                            203                               │
└─────────────────────────────────────────────────────────────┘
                              │
                              ▼
┌─────────────────────────────────────────────────────────────┐
│    DETECT A MISMATCH BETWEEN THE USER FLAG VALUE AND THE    │
│                     PROCESS FLAG VALUE                       │
│                            204                               │
└─────────────────────────────────────────────────────────────┘
                              │
                              ▼
┌─────────────────────────────────────────────────────────────┐
│ BASED ON DETECTING THE MISMATCH, AUTOMATICALLY SUSPEND      │
│ THE PROCESS FROM BEING EXECUTED ON THE USER COMPUTING       │
│                           SYSTEM                             │
│                            205                               │
└─────────────────────────────────────────────────────────────┘
```

FIG. 2

SYSTEM FOR CONTROLLING COMPUTING PROCESS EXECUTION BY USERS WITH ELEVATED ACCESS PRIVILEGE

FIELD OF THE INVENTION

The present disclosure embraces a system for controlling computing process execution by users with elevated access privilege.

BACKGROUND

There is a need for a way to control the processes that may be executed on a computing system.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for controlling computing process execution by users with elevated access privilege. In particular, the system may be configured to hook into the process command loop for a computing system within the network environment to monitor the users logged into the system as well as computing processes being executed. The system may further flag the users and processes according to their type. If the system detects a mismatch between the user and the process, the system may automatically suspend the process from being executed. The system may then initiate a remediation step such as a user authentication process. In this way, the system may ensure that processes are executed only by their authorized users.

Accordingly, embodiments of the present disclosure provide a system for controlling computing process execution by users with elevated access privilege. The system may comprise a memory device with computer-readable program code stored thereon; a communication device; and a processing device operatively coupled to the memory device and the communication device, wherein the processing device is configured to execute the computer-readable program code to detect that a user is attempting to execute a process on a user computing system; retrieve a user flag value associated with the user; retrieve a process flag value associated with the process; detect a mismatch between the user flag value and the process flag value; and based on detecting the mismatch, automatically suspend the process from being executed on the user computing system.

In some embodiments, the computer-readable program code further causes the processing device to prompt the user for additional user credentials; receive the additional user credentials from the user, wherein the additional user credentials are associated with a second user; retrieve a second user flag value associated with the second user; detect a match between the second user flag value and the process flag value; and based on detecting the match, allow the process to be executed on the user computing system.

In some embodiments, the user flag value indicates that the user has elevated access privileges, wherein the process flag value indicates that the process is a non-elevated process.

In some embodiments, the user has administrator or root privileges.

In some embodiments, the second user flag value indicates that the user has non-elevated access privileges, wherein the process flag value indicates that the process is a non-elevated process.

In some embodiments, the user flag value and the process flag value are binary values.

In some embodiments, the user flag value and the process flag value are alphanumeric character strings.

Embodiments of the present disclosure also provide a computer program product for controlling computing process execution by users with elevated access privilege. The computer program product may comprise at least one non-transitory computer readable medium having computer-readable program code portions embodied therein, the computer-readable program code portions comprising executable code portions for detecting that a user is attempting to execute a process on a user computing system; retrieving a user flag value associated with the user; retrieving a process flag value associated with the process; detecting a mismatch between the user flag value and the process flag value; and based on detecting the mismatch, automatically suspending the process from being executed on the user computing system.

In some embodiments, the computer-readable code portions further comprise executable code portions for prompting the user for additional user credentials; receiving the additional user credentials from the user, wherein the additional user credentials are associated with a second user; retrieving a second user flag value associated with the second user; detecting a match between the second user flag value and the process flag value; and based on detecting the match, allowing the process to be executed on the user computing system.

In some embodiments, the user flag value indicates that the user has elevated access privileges, wherein the process flag value indicates that the process is a non-elevated process.

In some embodiments, the user has administrator or root privileges.

In some embodiments, the second user flag value indicates that the user has non-elevated access privileges, wherein the process flag value indicates that the process is a non-elevated process.

In some embodiments, the user flag value and the process flag value are binary values.

Embodiments of the present disclosure also provide a computer-implemented method for controlling computing process execution by users with elevated access privilege, wherein the computer-implemented method comprises detecting that a user is attempting to execute a process on a user computing system; retrieving a user flag value associated with the user; retrieving a process flag value associated with the process; detecting a mismatch between the user flag value and the process flag value; and based on detecting the mismatch, automatically suspending the process from being executed on the user computing system.

In some embodiments, the computer-implemented method further comprises prompting the user for additional user credentials; receiving the additional user credentials from the user, wherein the additional user credentials are associated with a second user; retrieving a second user flag value associated with the second user; detecting a match between the second user flag value and the process flag value; and based on detecting the match, allowing the process to be executed on the user computing system.

In some embodiments, the user flag value indicates that the user has elevated access privileges, wherein the process flag value indicates that the process is a non-elevated process.

In some embodiments, the user has administrator or root privileges.

In some embodiments, the second user flag value indicates that the user has non-elevated access privileges, wherein the process flag value indicates that the process is a non-elevated process.

In some embodiments, the user flag value and the process flag value are binary values.

In some embodiments, the user flag value and the process flag value are alphanumeric character strings.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
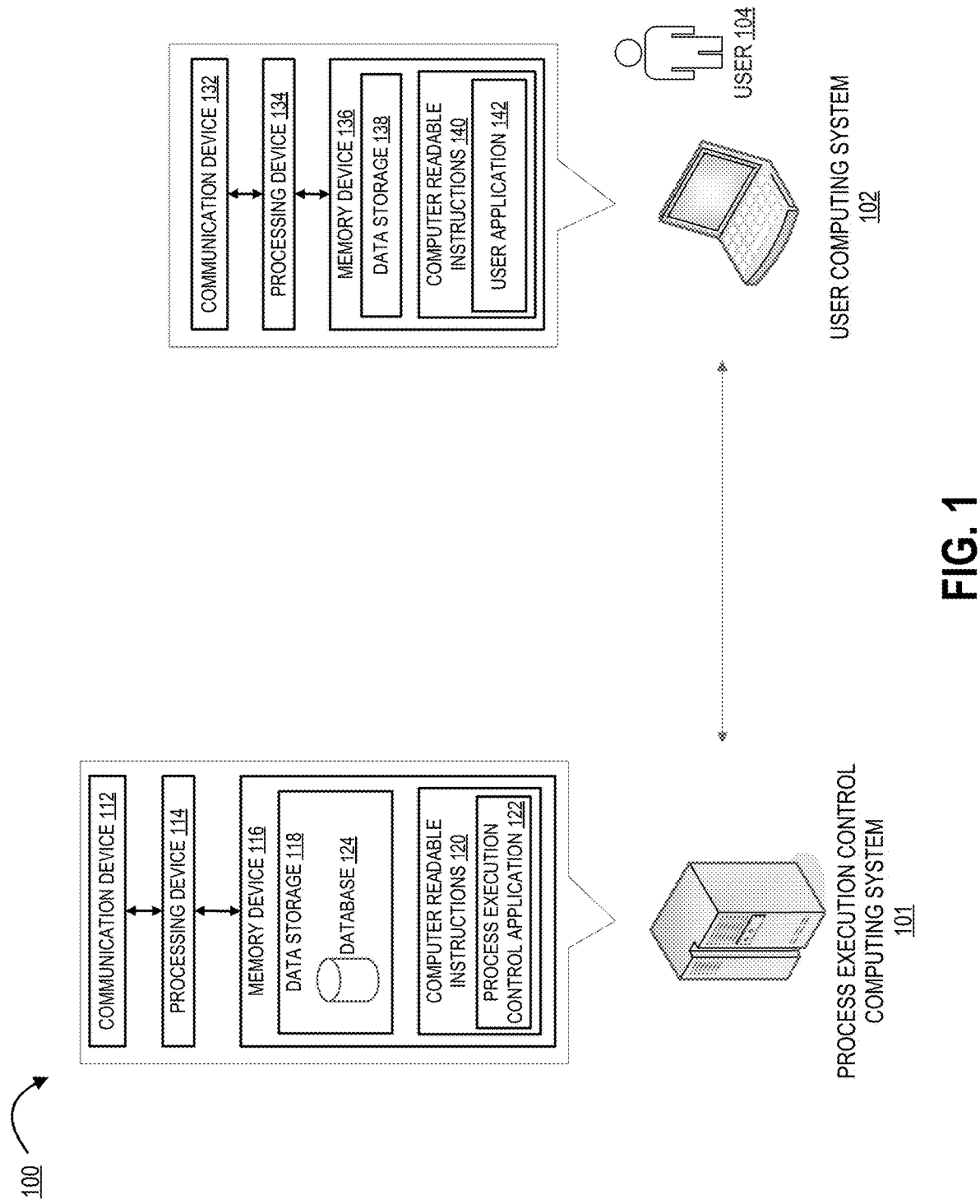

Having thus described embodiments of the invention in general terms, reference will now be made to the accompanying drawings, wherein:

FIG. 1 illustrates an operating environment for the process execution control system, in accordance with one embodiment of the present disclosure; and FIG. 2 illustrates a process flow for controlling computing process execution by users with elevated access privilege, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Resource" as used herein may refer to physical and virtual objects and/or processes used to accomplish the entity's objectives. In this regard, "resource" may refer to applications, data files, computing systems and/or hardware, computing resources (e.g., processing power, memory space, or the like), computing functions, or the like.

"Elevated user" or "privileged user" as used herein may refer to a user with login credentials that allow the user to execute elevated processes (e.g., installing/uninstalling software, changing system settings, installing updates, modifying core system files, or the like). An example of a privileged user may be a user with a root or administrator account. Accordingly, a "non-elevated user" or "non-privileged user" as used herein may refer to a user account without such credentials to execute elevated processes.

Within a computing system, it may be desirable to restrict the types of processes that may be executed by certain users. For instance, non-privileged users may be restricted from executing processes that may affect critical system files or components (e.g., installing an updated operating system kernel). That said, it may further be desirable to restrict privileged users from executing non-privileged processes (e.g., opening a word processing application).

In this regard, the system may be configured to monitor computing systems within the network. In particular, the system may track the users that are logged into the computing systems as well as the system calls placed by the user for process execution. Each user may be associated with a flag value (a "user flag value") which may be an alphanumeric value or string which may indicate the type or class to which the user belongs. For example, the user flag value may be a binary value (e.g., 0 or 1) which may indicate whether the user is a privileged or non-privileged user. Similarly, each process to be executed may also be associated with a flag value (a "process flag value"). Continuing the above example, the process flag value may be a binary value which may indicate whether the process is a privileged process (e.g., deleting system files) or a non-privileged process (e.g., connecting to a server).

Based on detecting a match or mismatch in the user flag values and the process flag values, the system may authorize or suspend processes from being executed by the user. For instance, if the system detects that a logged in privileged user is attempting to execute a non-privileged process, the system may automatically suspend the non-privileged process from being executed by the privileged user. In some embodiments, the system may subsequently be configured to prompt the privileged user for credentials matching the process to be executed (e.g., credentials for a non-privileged user). Once the privileged user has provided credentials for a non-privileged user, the system may allow the process to be executed.

An exemplary embodiment is provided for illustrative purposes. In one embodiment, the system may detect that a user who is logged in with administrator privileges is attempting to launch a word processing application. The system may retrieve a user flag value for the user, where the user flag value may indicate that the user is a privileged user (e.g., user flag value is 1). The system may also retrieve a process flag value associated with launching the application, where the process flag value may indicate that the (e.g., process flag value is 0). The system may then detect a mismatch between the user flag value and the process flag value (e.g., 1 vs 0, respectively). Based on detecting the mismatch, the system may prevent the administrator user from launching the application. The system may further prompt the administrator for user credentials (e.g., credentials associated with a normal user). Once the system receives such credentials from the administrator, the system may allow the process to be executed.

The system as described herein confers a number of technological advantages over conventional process control systems. In particular, by restricting process execution in the manner described above, the system may ensure that privileged users only execute privileged process while non-privileged users only execute non-privileged processes. In turn, the system may reduce the possibility of unintentional use of administrator accounts to execute privileged processes.

Turning now to the figures, FIG. 1 illustrates an operating environment 100 for the process execution control system, in accordance with one embodiment of the present disclosure. In particular, FIG. 1 illustrates a process execution control computing system 101 that is operatively coupled, via a network, to a user computing system 102. In such a configuration, the process execution control computing system 101 may transmit information to and/or receive information from the user computing system 102. It should be understood that FIG. 1 illustrates only an exemplary embodiment of the operating environment 100, and it will be appreciated that one or more functions of the systems, devices, or servers as depicted in FIG. 1 may be combined into a single system, device, or server. For example, the functions of the process execution control computing system 101 may, in some embodiments, be performed by the user computing system 102. Furthermore, a single system, device, or server as depicted in FIG. 1 may represent multiple systems, devices, or servers. For instance, though the user computing system 102 is depicted as a single unit, the operating environment 100 may comprise multiple user computing systems 102 which may be monitored and/or controlled by the process execution control computing system 101.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the process execution control computing system 101 may be a networked server, desktop computer, laptop computer, routing device, or other type of computing system within the network environment which performs the process execution control functions as described herein. Accordingly, the process execution control computing system 101 may comprise a processing device 114 operatively coupled to a communication device 112 and a memory device 116 having data storage 118 and computer readable instructions 120 stored thereon. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 uses the communication device 112 to communicate with the network and other devices on the network, such as, but not limited to the user computing system 102. The communication device 112 generally comprises a modem, antennae, WiFi or Ethernet adapter, radio transceiver, or other device for communicating with other devices on the network.

The computer-readable instructions 120 may comprise a process execution control application 122, which may comprise computer-executable program code which may instruct the processing device 114 to perform certain logic, data processing, and data storing functions of the application to accomplish the entity's objectives. For instance, the process execution control application 122 may hook into the process command loop of the user computing system 102 to monitor user activity and/or processes executed on the user computing system 102.

In some embodiments, the memory device 116 includes data storage 118 for storing data related to the system environment. In this regard, the data storage 118 may comprise a database 124, which may comprise information regarding flags associated with various users and/or processes. Accordingly, in one embodiment, the database 124 may be a relational (e.g., SQL) database which may comprise a table of users and processes along with their associated flags. It should be understood that in alternative embodiments, the database 124 may be hosted on a separate computing system (e.g., a database server) instead of being hosted on the process execution control computing system 101.

As further illustrated in FIG. 1, the operating environment 100 may further comprise a user computing system 102 in operative communication with the process execution control computing system 101. In some embodiments, the user computing system 102 may be a computing system that is operated by a user 104, such as an administrator, agent, or employee of the entity. Accordingly, the user computing system 102 may be a device such as a desktop computer, laptop, IoT device, smartphone, tablet, single-board computer, or the like. The user computing system 102 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The user computing system 102 may comprise a processing device 134 operatively coupled to a communication device 132 and a memory device 136 having data storage 138 and computer readable instructions 140 stored thereon, where the computer readable instructions 140 may include a user application 142. The user application 142 may be, for instance, a process or program that may be executed by the user 104.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for controlling computing process execution by users with elevated access privilege, in accordance with some embodiments. The process begins at block 201, where the system detects that a user is attempting to execute a process on a user computing system. The system may hook into the user computing system to monitor system calls sent and/or received by the various components and processes within the user computing system. Accordingly, the system may continuously track information about the user computing system, such as which user is currently logged in, what processes are currently running under the user, what processes the user is attempting to execute, and the like.

The process continues to block 202, where the system retrieves a user flag value associated with the user. The user flag value may be an alphanumeric value or string which may indicate a type or class to which the user belongs. For instance, the user flag value may be a binary value which may indicate whether the user has elevated privileges such as root access (e.g., the user flag value is 1) or non-elevated privileges such as normal user access (e.g., the user flag value is 0). In other embodiments, the user flag value may be a descriptor of the user class (e.g., the user flag value is "root"). The user flag value may, in some embodiments, be stored in a flag value database.

The process continues to block 203, where the system retrieves a process flag value associated with the process. The process flag value may also be an alphanumeric value or string which may indicate a type or class to which the process belongs. For example, the process flag value may be a binary value which may indicate whether the process requires elevated privileges to execute (e.g., the process flag value is 1) or non-elevated privileges (e.g., the process flag value is 0). In other embodiments, the process flag value may be a descriptor of the type of privileges required to execute the process (e.g., the process flag value is "root"). The process flag value may also be stored in the flag value database.

The process continues to block 204, where the system detects a mismatch between the user flag value and the process flag value. In this regard, the system may compare the user flag value associated with the currently logged in user with the process flag value of the process that the user is attempting to execute. If the user flag value equals the process flag value, the system may consider the user to be matched with the process. However, if the user flag value is not equal to the process flag value, the system may detect that the user is mismatched with the process that the user is attempting to execute.

The process continues to block 205, where the system, based on detecting the mismatch, automatically suspends the process from being executed on the user computing system. Continuing the above example, the system may prevent the application from being launched on the user computing system. In some embodiments, the system may further prompt the user for additional user credentials (e.g., credentials associated with a second user) for a user account which has the correct level of privileges for the process to be executed. For instance, the system may prompt the administrator to enter credentials (e.g., a username and password) associated with a non-privileged user (e.g., a second user). Once the system receives such credentials, the system may retrieve a second user flag value associated with the second user and compare the second user flag value with the process flag value. Upon detecting a match, the system may allow the process to be executed on the user computing system using the credentials of the second user. In this way, the system may ensure that privileged user accounts are used only to execute privileged processes, which in turn reduces the chance for misuse or unintentional use of privileged accounts.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for controlling computing process execution by users with elevated access privilege, the system comprising:
   a memory device with computer-readable program code stored thereon;
   a communication device; and
   a processing device operatively coupled to the memory device and the communication device, wherein the processing device is configured to execute the computer-readable program code to:
   detect that a user is attempting to execute a process on a user computing system;
   retrieve a user flag value associated with the user;
   retrieve a process flag value associated with the process;
   detect a mismatch between the user flag value and the process flag value, wherein detecting the mismatch comprises:

a) detecting, based on the user flag value, that the user has elevated access privileges; and
b) detecting, based on the process flag value, that the process is a non-elevated process; and
based on detecting the mismatch, automatically suspend the process from being executed on the user computing system.

2. The system according to claim 1, wherein the user has administrator or root privileges.

3. The system according to claim 1, wherein the user flag value and the process flag value are binary values.

4. The system according to claim 1, wherein the user flag value and the process flag value are alphanumeric character strings.

5. The system according to claim 1, wherein the computer-readable program code further causes the processing device to:
prompt the user for additional user credentials;
receive the additional user credentials from the user, wherein the additional user credentials are associated with a second user;
retrieve a second user flag value associated with the second user;
detect a match between the second user flag value and the process flag value; and
based on detecting the match, allow the process to be executed on the user computing system.

6. The system according to claim 5, wherein the second user flag value indicates that the user has non-elevated access privileges, wherein the process flag value indicates that the process is a non-elevated process.

7. A computer program product for controlling computing process execution by users with elevated access privilege, the computer program product comprising at least one non-transitory computer readable medium having computer-readable program code portions embodied therein, the computer-readable program code portions comprising executable code portions for:
detecting that a user is attempting to execute a process on a user computing system;
retrieving a user flag value associated with the user;
retrieving a process flag value associated with the process;
detecting a mismatch between the user flag value and the process flag value, wherein detecting the mismatch comprises:
a) detecting, based on the user flag value, that the user has elevated access privileges; and
b) detecting, based on the process flag value, that the process is a non-elevated process; and
based on detecting the mismatch, automatically suspending the process from being executed on the user computing system.

8. The computer program product according to claim 7, wherein the user has administrator or root privileges.

9. The computer program product according to claim 7, wherein the user flag value and the process flag value are binary values.

10. The computer program product according to claim 7, wherein the computer-readable code portions further comprise executable code portions for:
prompting the user for additional user credentials;
receiving the additional user credentials from the user, wherein the additional user credentials are associated with a second user;
retrieving a second user flag value associated with the second user;
detecting a match between the second user flag value and the process flag value; and
based on detecting the match, allowing the process to be executed on the user computing system.

11. The computer program product according to claim 10, wherein the second user flag value indicates that the user has non-elevated access privileges, wherein the process flag value indicates that the process is a non-elevated process.

12. A computer-implemented method for controlling computing process execution by users with elevated access privilege, wherein the computer-implemented method comprises:
detecting that a user is attempting to execute a process on a user computing system;
retrieving a user flag value associated with the user;
retrieving a process flag value associated with the process;
detecting a mismatch between the user flag value and the process flag value, wherein detecting the mismatch comprises:
a) detecting, based on the user flag value, that the user has elevated access privileges; and
b) detecting, based on the process flag value, that the process is a non-elevated process; and
based on detecting the mismatch, automatically suspending the process from being executed on the user computing system.

13. The computer-implemented method according to claim 12, wherein the user has administrator or root privileges.

14. The computer-implemented method according to claim 12, wherein the user flag value and the process flag value are binary values.

15. The computer-implemented method according to claim 12, wherein the user flag value and the process flag value are alphanumeric character strings.

16. The computer-implemented method according to claim 12, wherein the computer-implemented method further comprises:
prompting the user for additional user credentials;
receiving the additional user credentials from the user, wherein the additional user credentials are associated with a second user;
retrieving a second user flag value associated with the second user;
detecting a match between the second user flag value and the process flag value; and
based on detecting the match, allowing the process to be executed on the user computing system.

17. The computer-implemented method according to claim 16, wherein the second user flag value indicates that the user has non-elevated access privileges, wherein the process flag value indicates that the process is a non-elevated process.

* * * * *